(No Model.)
W. L. MORRIS.
CALIPER JOINT.
No. 458,684. Patented Sept. 1, 1891.
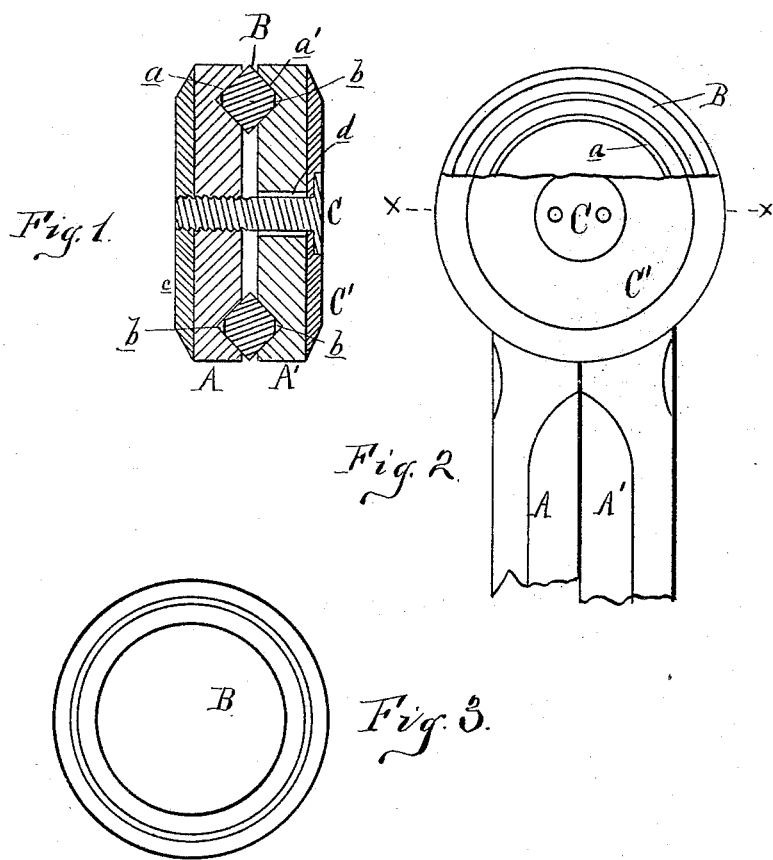
Witnesses
H. B. S. Morgan
A. L. Gates
Inventor
Wm. L. Morris
By his Attorneys
Osborne & Co.

UNITED STATES PATENT OFFICE.

WILLIAM L. MORRIS, OF CLEVELAND, OHIO.

CALIPER-JOINT.

SPECIFICATION forming part of Letters Patent No. 458,684, dated September 1, 1891.

Application filed September 5, 1890. Serial No. 364,078. (No model.)

*To all whom it may concern:*

Be it known that I, WILLIAM L. MORRIS, a citizen of the United States, residing at Cleveland, in the county of Cuyahoga and State of Ohio, have invented certain new and useful Improvements in Dividers, of which the following, with the accompanying drawings, is a specification.

The object of my invention is to so improve draftsmen's dividers as to cheapen their manufacture, increase their life, and make provision against any looseness of the joint as the dividers become worn by use. These objects are accomplished by means of the novel construction and combination of parts shown in the drawings, described herein, and defined in the claims.

Figure 1 is a cross-section on the line $x\,x$ in Fig. 2. Fig. 2 is a side elevation with the washer and head of the adjacent leg broken away, showing the position of the bearing-ring in the groove. Fig. 3 is a plan of the bearing-ring removed.

In the accompanying drawings, which form a part of this specification, A and A' represent the legs of dividers, which are preferably made integral with their heads. In the inner face of each head of these legs is formed an annular V-shaped groove $a$ and $a'$. A bearing-ring B, preferably substantially of the cross-section shown in Fig. 1, is placed between the opposing faces of the heads of the legs resting within their respective grooves. I prefer that the points of said bearing-ring B be cut off, so that the ring will not reach to the bottom of the grooves in the heads; but on the contrary will leave a little space between them and the ring, as shown at $b$. The ring B should also be thick enough so as not to allow the opposing faces of the heads to come together when the parts are adjusted together. A binding-screw C, with a jam-nut $c$, holds the parts of the dividers to their respective positions. The head of said screw is preferably countersunk in a washer C'. The bore of the head portion, against which the washer C' bears, is large enough to be free of the binding-screw C, as seen at $d$.

In my construction of dividers no steel joint-strip is needed, as is employed in dividers as ordinarily made. This saves milling the leg and inserting such strip in their manufacture, thus cheapening their production. It will readily be seen that the wear of the parts may be taken up by tightening the binding-screw C, which will avoid the annoyances of wear of the parts and prevent any lost motion in the joint and preclude the possibility of any radial movement of the legs when the instrument is set and in use.

My improvement may take on various changes in detail without departing from the spirit of my invention. For instance, the bearing-ring and the grooves made to receive it may be made of different forms in cross-section than that shown. A space may be left between the ring and the grooves at either the outer or inner edge or circumference of the ring; or one of the head portions may be made of steel or other suitable hard metal, the bearing-ring being formed integrally therewith, and of a form to fit a bearing groove or seat formed to receive it in the opposite portion of the divider-head; or, again, the inner faces of the heads may be chamfered to receive a bearing-ring which substantially encircles the heads.

It will be observed that by the employment of a supplemental bearing, as herein described, while there is a bearing at the pivotal point in the longitudinal direction of the divider, or at substantially right angles to the axis of the pivot, I also provide a side bearing for each head portion in a line substantially parallel to the axis. Hence in the wear of the dividers after continual use I obviate the possibility of the heads centering at any point other than upon a true circle and substantially parallel lines to the axis of the retaining-screw.

What I claim as my invention is—

1. In dividers, a bearing ring or face, in combination with a head provided with an annular groove having diverging walls, substantially as and for the purposes described.

2. The combination, in dividers, of legs having heads with annular grooves having diverging walls formed in their inner faces, a bearing-ring seated in said annular grooves, and means for securing the parts together, substantially as and for the purposes specified.

3. In dividers, the combination, with the legs having heads, each of said heads having a groove formed with diverging walls, as described, of a bearing-ring seated within said groove and of such size or shape that its corners will be out of contact with the corners of the walls of said grooves, substantially as and for the purposes specified.

4. In dividers, the combination, with a binding-screw and jam-nut, of the legs having heads, each of said heads having a groove formed with diverging walls, as described, and also provided with openings for the passage of the binding-screw, the opening in one of said heads being of greater diameter than said screw, and a bearing-ring seated within said grooves of the heads, having its corners out of contact with the corners of the walls thereof.

5. The combination, in dividers, of legs having heads provided with annular grooves formed with diverging walls in their inner faces, a supplemental bearing-ring seated in said grooves, and a binding-screw for retaining the parts in their relative positions, substantially as and for the purposes set forth.

In testimony whereof I affix my signature, in presence of two witnesses, this 30th day of August, 1890.

WM. L. MORRIS.

Witnesses:
H. S. SPRAGUE,
F. B. S. MORGAN.